United States Patent [19]
Pohling

[11] Patent Number: 5,911,390
[45] Date of Patent: Jun. 15, 1999

[54] BOBWEIGHT ASSEMBLY FOR ESTABLISHING A FORCE FEEDBACK ON A MANUALLY MOVABLE CONTROL ELEMENT

[75] Inventor: John G. Pohling, Garden Grove, Calif.

[73] Assignee: McDonnell Douglas Corporation, St. Louis County, Mo.

[21] Appl. No.: 08/891,854

[22] Filed: Jul. 9, 1997

[51] Int. Cl.⁶ .......................... B64C 13/04; B64C 13/46
[52] U.S. Cl. .................. 244/223; 244/221; 244/232; 244/75 R
[58] Field of Search ................... 244/221, 223, 244/229, 232, 75 R

[56] References Cited

U.S. PATENT DOCUMENTS

| | | | |
|---|---|---|---|
| 2,661,169 | 12/1953 | Ashkenas | 244/83 |
| 2,772,841 | 12/1956 | Bonsteel | 244/83 |
| 2,797,882 | 7/1957 | Servanty | 244/76 |
| 2,801,060 | 7/1957 | Bousteel et al. | 244/223 |
| 2,857,120 | 10/1958 | Habbard | 244/223 |
| 3,002,714 | 10/1961 | Decker | 244/83 |
| 3,747,876 | 7/1973 | Fortna et al. | 244/83 |
| 3,773,282 | 11/1973 | Sands et al. | 244/83 |
| 4,428,550 | 1/1984 | Evans et al. | 244/93 |

*Primary Examiner*—J. Woodrow Eldred
*Attorney, Agent, or Firm*—Brooks & Kushman P.C.

[57] ABSTRACT

A pilot-operated lever assembly for adjusting control surfaces of an aircraft including a bobweight for creating inertia forces that simulate a force feedback due to aerodynamic forces on the control surfaces. The bobweight effect is variable as a function of airspeed and other operating variables. An actuator for adjusting the geometry of the lever assembly creates a variable bobweight effect. The mass of the actuator acts as a bobweight mass.

8 Claims, 4 Drawing Sheets

BOBWEIGHT ASSEMBLY FOR ESTABLISHING A FORCE FEEDBACK ON A MANUALLY MOVABLE CONTROL ELEMENT

TECHNICAL FIELD

This invention relates to manually operable controls for use with a powered aircraft control surface that is subjected to aerodynamic forces.

BACKGROUND ART

Aircraft flight controls that have power actuators for controlling the position of the control surfaces, such as electric motors and hydraulic or pneumatic actuators, lack the ability to transmit control surface forces to the pilot through the control stick or rudder pedals. The pilot thus does not have an indication of a so-called "load feel" which would indicate control surface forces. It therefore is common practice in arrangements of this type to provide a synthetic feel in order to simulate conventional control forces acting on the control surfaces of an aircraft during flight maneuvers. The presence of a so-called control feel is especially important during control of aircraft elevator surfaces where acceleration forces of the aircraft in the direction of the vertical axis of the aircraft might have a potential for causing a structural overload.

It is known in the prior art to provide an artificial load feel for the pilot by using springs and bobweights. The bobweight makes a correction for stick force by providing an increment in the normal acceleration force equal to the acceleration of gravity or "g" loading. Such a correction will improve the pilot's perception of maneuvering stability of the aircraft. Another desirable characteristic of a pilot-operated control surface actuator is the ability of the forces acting on the pilot-operated element to return the pilot-operated element to a neutral position quickly.

It is desirable for the artificial feel that is developed by the powered control surface mechanism to be approximately proportional to the acceleration forces induced by the pilot in his or her control action. The optimum feedback force required for improved control effectiveness at high airspeeds is higher than the force required for low airspeeds. Further, it is necessary that artificial feedback mechanisms provide force gradients that are sufficient to ensure stability of the aircraft. That is, it is necessary for effective stability control that the pilot input force be generally proportional to incremental acceleration.

I am aware of prior art designs in which control surface feedback forces generated by artificial feel systems are varied in response to changes in airspeed and other operating variables, including altitude changes and changes in the center of gravity of the aircraft during flight. U.S. Pat. No. 3,747,876, for example, shows force gradients that may be varied using a leverage system that is subjected to spring forces wherein the mechanical advantage of the leverage system can be changed by an actuator that responds to changes in airspeed. The system of the '876 patent, however, does not employ a simplified bobweight mechanism. Rather, it uses a multiple lever actuator and cam actuator system with a means for varying the leverage ratio of the control surface actuator linkage.

Prior art U.S. Pat. No. 2,661,169 shows an aircraft control stick force linkage with a stationary bobweight that creates a force moment on the control stick of an aircraft. It is balanced by a balance spring in a conventional fashion. The control stick leverage system, however, has an auxiliary linkage that extends to a force bellows, the opposite sides of which are subjected to the static pressure on the upper surface of an airfoil and to the ram pressure at the lower surface. Thus, the bellows force is a function of the square of the aircraft airspeed. This bellows force is transmitted to the aircraft control stick to complement the force moment imparted to the control stick by the bobweight. The bobweight force, as in the case of other known bobweight designs, cannot be varied in response to changing operating variables that are experienced during maneuver of the aircraft.

DISCLOSURE OF THE INVENTION

The invention comprises an improved artificial force feedback mechanism for a driven member such as an aircraft control surface using a bobweight that makes a correction for the force on an input member such as the pilot-actuated force input lever for each "g" loading during flight maneuvers, thereby improving maneuvering stability. The mechanism includes an adjustable bobweight capable of providing a variable feedback force that depends upon airspeed and other variables.

The principal elements of the linkage mechanism for connecting the pilot-operated element to the movable control surfaces comprises a bobweight together with a bobweight actuator that forms a part of the control surface actuator linkage. The actuator may respond to changes in airspeed to provide a variable bobweight effect. This permits the pilot to experience improved artificial feel at the pilot-actuated element during high-speed maneuvering, thereby giving the pilot full control of the control surfaces without the necessity of exerting extreme forces at the control element.

It is possible by using the improvements of the invention for the pilot to move the pilot-operated control element to a zero-force position without the necessity for using an independent pilot-operated trim control. This simplifies the ability of the pilot to maintain the stability of the aircraft during a variety of aircraft flight maneuvers and throughout a range of airspeeds.

The invention includes an actuator motor for adjusting the geometry of the linkage system that connects the aircraft control surface to the pilot-operated element. The actuator itself responds to a controller that senses airspeed as it adjusts the geometry of the aircraft control surface lever system to achieve a variable bobweight effect. The actuator itself in accordance with one objective of the invention acts as its own bobweight mass, thereby eliminating the necessity for providing a separate dedicated bobweight mass.

In accordance with another objective of the invention the bobweight effect in one preferred embodiment varies as a function of the speed, the minimal bobweight effect occurring at airspeeds of 250 knots or less. A full bobweight effect is achieved at a preselected higher airspeed. The bobweight effect at speeds below the upper limit and above the lower limit is variable.

The invention has a fulcrum member pivotally supporting the pilot-operated member, the bobweight lever being pivoted on the fulcrum member. The actuator is carried at one end of the bobweight lever.

An end of an extendable shaft is connected to a first link which in turn is connected to the bobweight lever. A second link connects the extended end of the actuator shaft to the pilot-operated member.

In accordance with still another objective of the invention, the bobweight effect due to bobweight inertia forces is varied between pre-designed limits as the actuator shaft length is changed.

While an embodiment of this invention is illustrated and disclosed, this should not be construed to limit the claims. It is anticipated that various modifications and alternative designs may be made without departing from the scope of the invention.

BEST MODE FOR CARRYING OUT THE INVENTION

Figure 1:
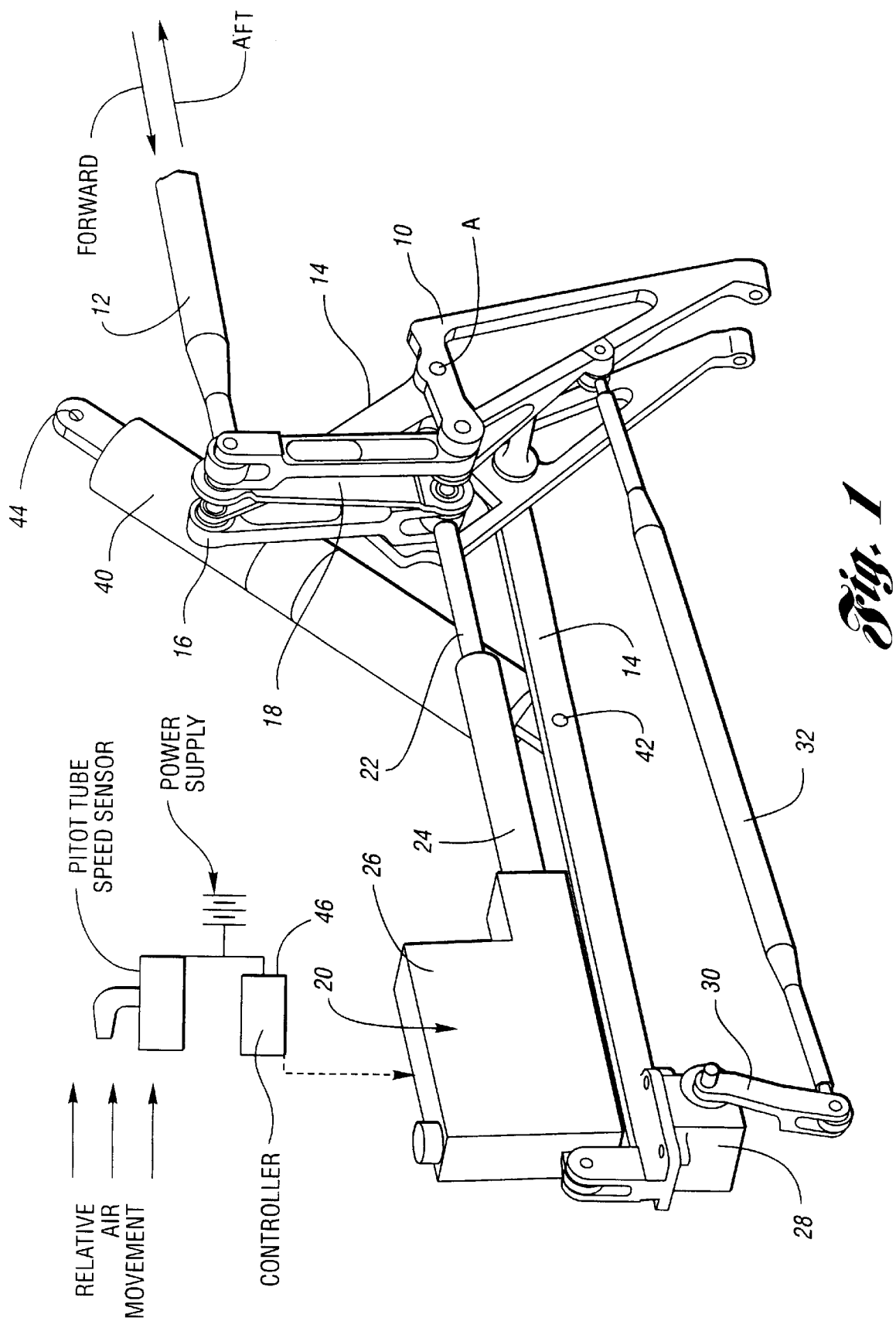
FIG. 1 is an isometric assembly view of the linkage system of the invention used for actuating an aircraft control surface by means of a pilot-operated element.

In FIG. 1, reference numeral 10 designates a stationary mounting bracket or fixed fulcrum element for the bobweight mechanism. It may be secured to a bulkhead in the part of the fuselage that defines the pilot's compartment. The pilot control element, which sometimes is referred to as a control stick, is not illustrated in FIG. 1. When the control stick is moved forward, a control shaft 12 is moved in the forward direction illustrated by the forward directional arrow. Forward movement of the control stick in this fashion would cause the elevators, for example, to be lowered. When the control stick is moved in the aft direction, the control shaft member 12 is moved in the direction of the aft directional arrow, which would cause the elevators to rise.

A bobweight lever 14 is pivoted on the support bracket 10 as shown at 16A. The bobweight lever 14 extends to the left of the pivot point A, as seen in FIG. 1, and extends also upward from pivot point A. The uppermost end of the generally vertical portion of the linkage member 14 is connected pivotally at D to linkage element 16. A linkage element 18 is connected to control shaft 12 at pivot point E, and the lower end of linkage element 18 is pivoted at C to an actuator 20.

The leftward extremity of the generally horizontal portion of lever 14 carries the actuator 20. This may be an electric motor or a hydraulic or pneumatic motor. In either case, it comprises an extendable output shaft 22 that is slidably received in a collar 24 that forms a part of or is connected to the actuator housing shown at 26.

A damper, shown at 28, has a torque input element 30 that is connected by actuator rod 32 to the stationary bracket structure 10. Upon movement of the linkage member 14 in a vertical plane, the output member 30 for the damper 28 rocks clockwise or counterclockwise depending upon the direction of movement of the member 14. The damper 28, for example, may be a well known eddy current damper or a hydraulic damper having a rotary vane operating in a viscous fluid. In the alternative, it may comprise relatively moveable friction elements capable of developing a damping force resisting oscillating motion of the output element 30.

Figure 2:
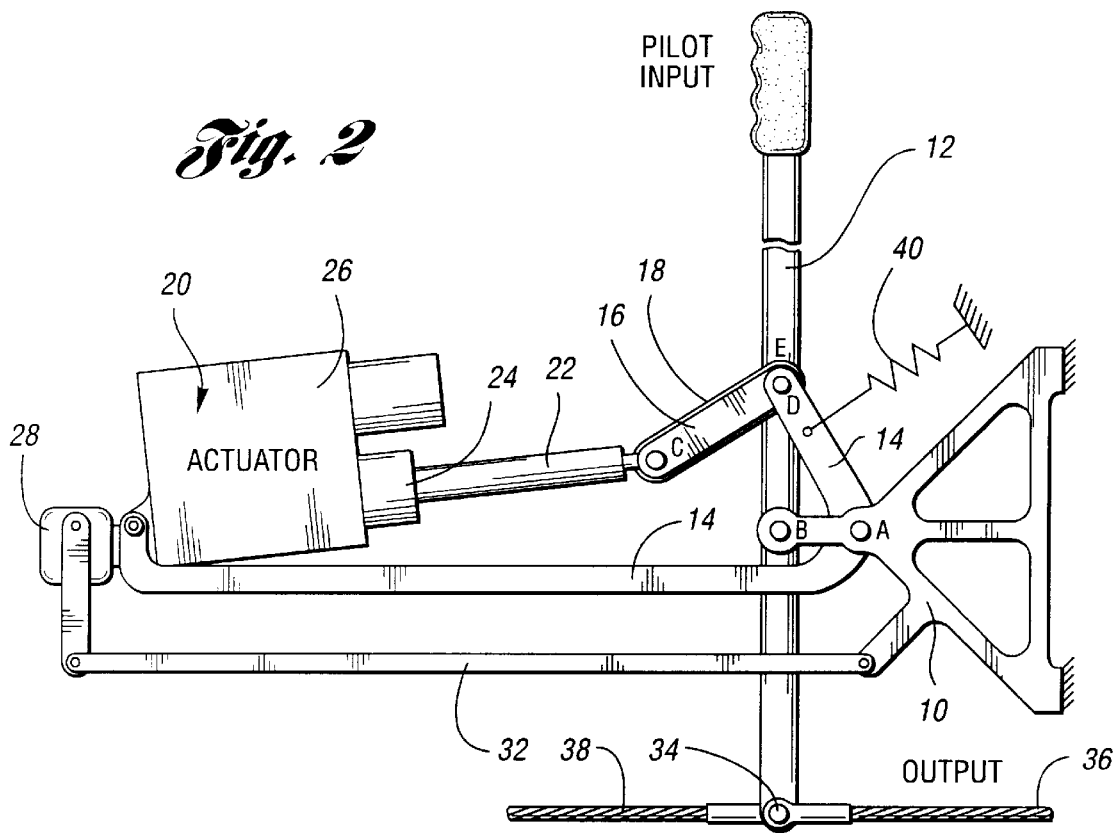
FIG. 2 is a schematic view of the linkage system of FIG. 1 wherein the pilot-operated element is in a neutral position.

In the schematic representation of FIG. 2, the pilot input element is in the form of a control stick 12 rather than the actuator shaft 12 of FIG. 1. The control stick 12 acts as a pilot force input member, the pilot input hand grip being illustrated in FIGS. 2–7. It is pivoted at point B, shown in FIG. 2, to the stationary member 10. Member 14 and member 16 are pivoted together at pivot point D. Member 16 and member 18 are pivoted together at pivot point C. Members 18 and 12 are pivoted together at point E. The pilot input member 12 is pivoted at pivot point B on the stationary support bracket 10.

The lower ends of the members 16 and 18 are pinned together, as mentioned above, at pivot point C. Pivot point C also is the point of an articulated connection at the extended end of actuator rod 22.

The pilot input member 12 is shown in FIG. 2 in the neutral position. The actuator 20, as seen in FIG. 2, has adjusted the actuator rod 22 to provide a full bobweight effect when the pilot input member 12 is in the neutral position. Thus, a counterclockwise moment will be introduced by the mass of the actuator, which tends to move the members 14 and 16 in a counterclockwise direction about pivot point A, thus rotating input member 12 in a counterclockwise direction about pivot point B via member 18.

The operating end or motion output portion of the member 12 is connected at 34 to control cables 36 and 38, which extend to control surfaces such as the elevators for an aircraft tail assembly. The counterclockwise moment created by the mass of the actuator is resisted by a balance spring assembly, which is illustrated at 40 in FIG. 1. One end of the balance spring is connected to member 14 at pivot point 42, and the opposite end is connected to a stationary structure such as the bracket 10 at pivot point 44. For purposes of simplification, the balance spring has been illustrated schematically in FIGS. 2–7.

With the actuator shaft 22 positioned to provide maximum bobweight effect, full inertia moments will be transmitted to the pilot-operated member 12 during turning maneuvers or during straight-ahead flight when air turbulence may cause a so-called bump on the aircraft in either a vertical or a downward direction. Such acceleration forces produce a moment that is felt by the pilot. It complements the force that is transmitted directly through the control cable system from the aircraft control surfaces to the pilot input member 12.

Figure 3:
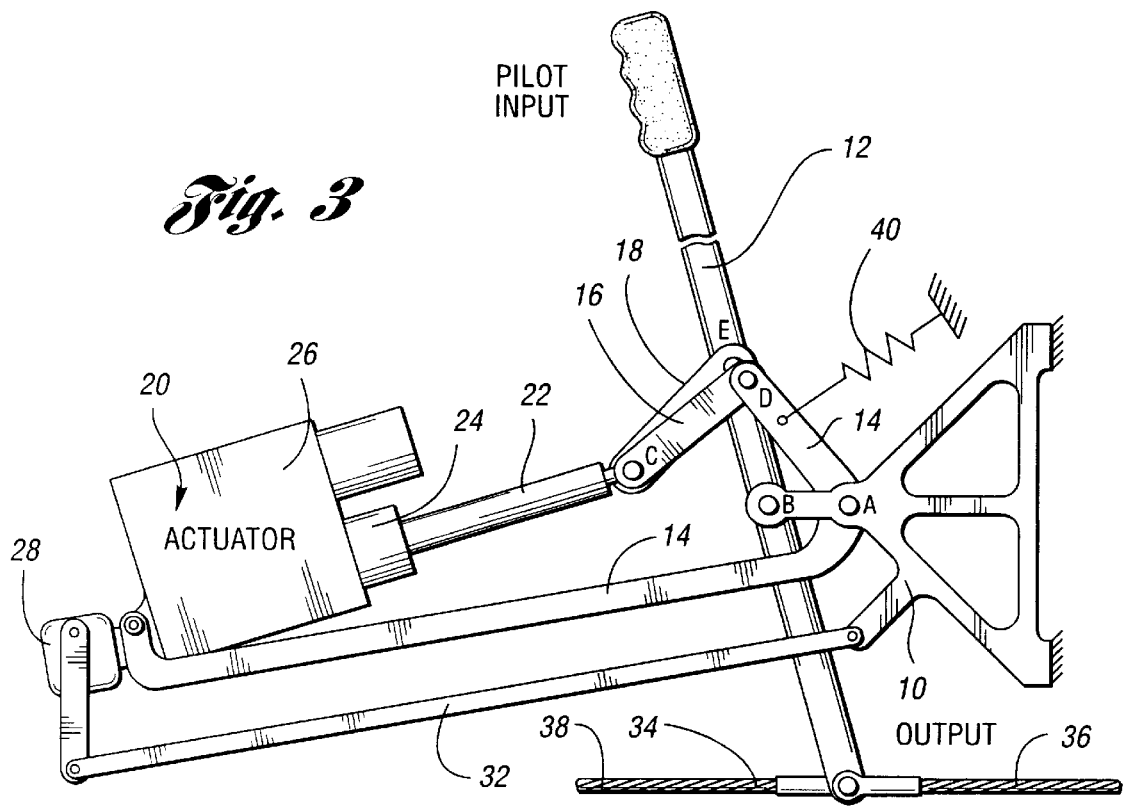
FIG. 3 is a schematic view of the linkage system of FIG. 1 wherein the pilot-operated element is in a forward control position and a bobweight actuator adjusted to provide a full bobweight effect.

In FIG. 3, the pilot has moved the control member 12 in the forward direction. Again, the actuator is positioned for full bobweight effect. The moment that is created by the mass of the actuator is opposed by an increased balanced spring force because of the extension of the balance spring 40 seen in FIG. 1.

Figure 4:
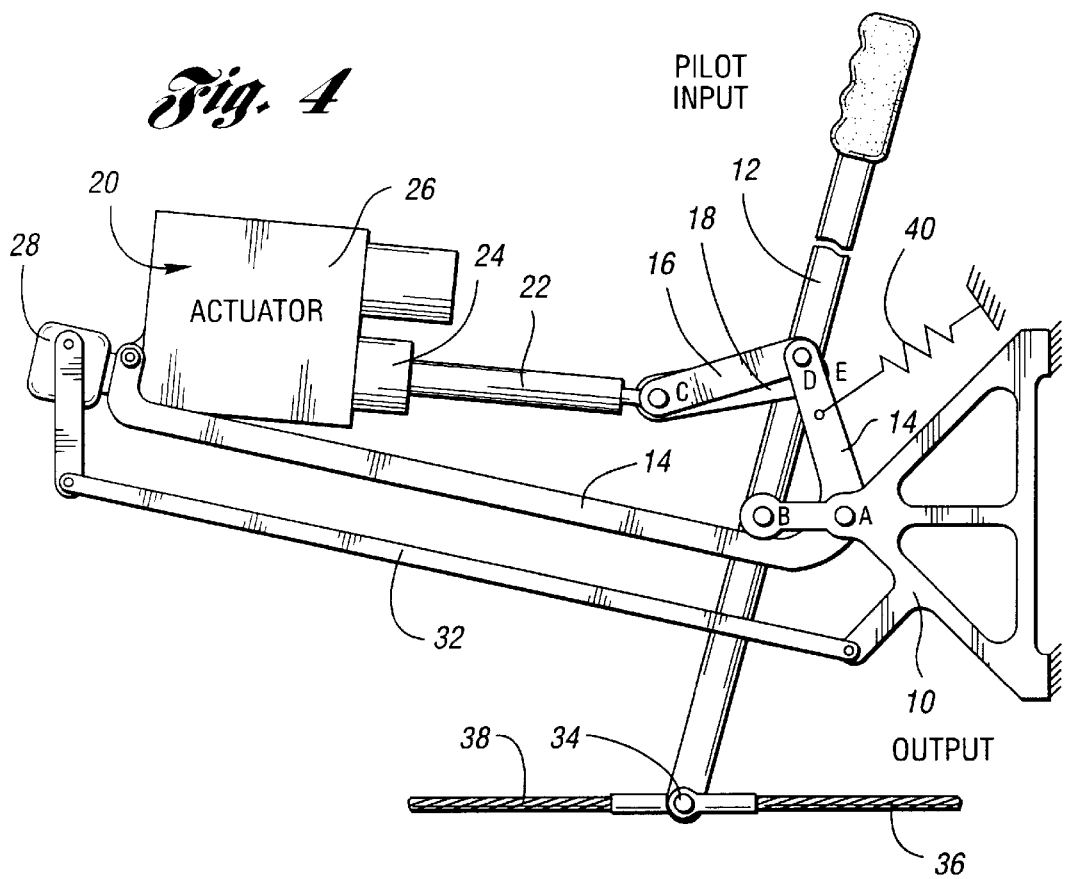
FIG. 4 is a schematic representation of the linkage of FIG. 1 wherein the pilot input element is adjusted rearwardly to effect an upward movement of the aircraft elevators wherein the actuator is adjusted to the full bobweight effect position.

FIG. 4 shows the actuator position for full bobweight effect and the pilot-operated member 12 positioned in a rearward direction, which would correspond to upward movement of the elevators of the tail assembly. In this instance, the spring force of the balance spring would be lower than the spring force that would exist in the condition shown in FIG. 3. The net feel experienced by the pilot on the control member 12 would be the sum of the balance spring force and the bobweight moment.

Figure 5:
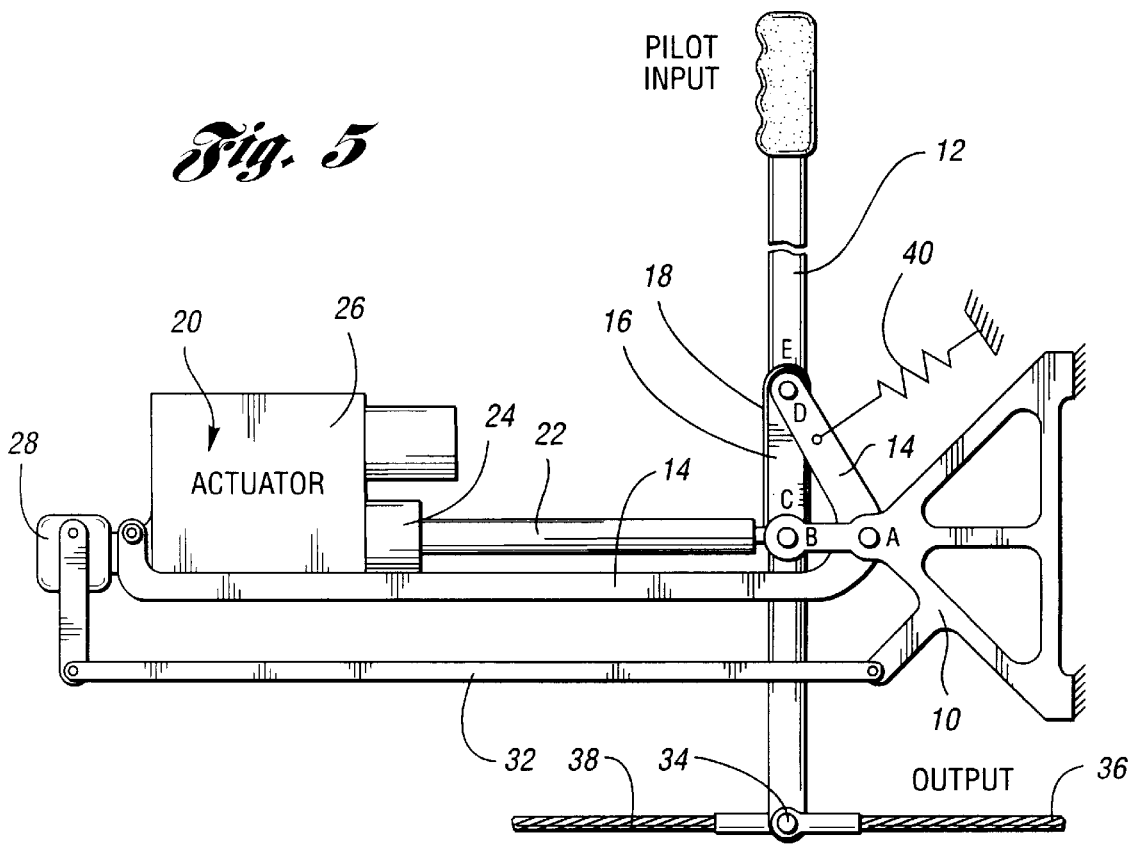
FIG. 5 shows the linkage of FIG. 6 as it would appear at lower airspeeds such as airspeeds below 250 knots, the actuator being adjusted to provide a zero bobweight effect.

FIG. 5 shows the actuator 20 adjusted to a position where pivot points C and B are coincident. This would provide a zero bobweight effect. Movement of the pilot-operated member 12 forward to the position shown in FIG. 6 and rearward to the position shown in FIG. 7 from the position shown in FIG. 5 would not result in a bobweight effect. The balance spring force continues to act on the control member 12. The net feel experienced by the pilot on the member 12 would not be modified by the bobweight effect.

The actuator may adjust the control shaft 22 between the full bobweight effect position and the zero bobweight effect position depending upon airspeed. Illustrated schematically in FIG. 1 is an airspeed pitot tube speed sensor, although it is contemplated that any other speed sensor device could be used for providing an airspeed input to a controller, shown schematically at 46 in FIG. 1.

Figure 6:
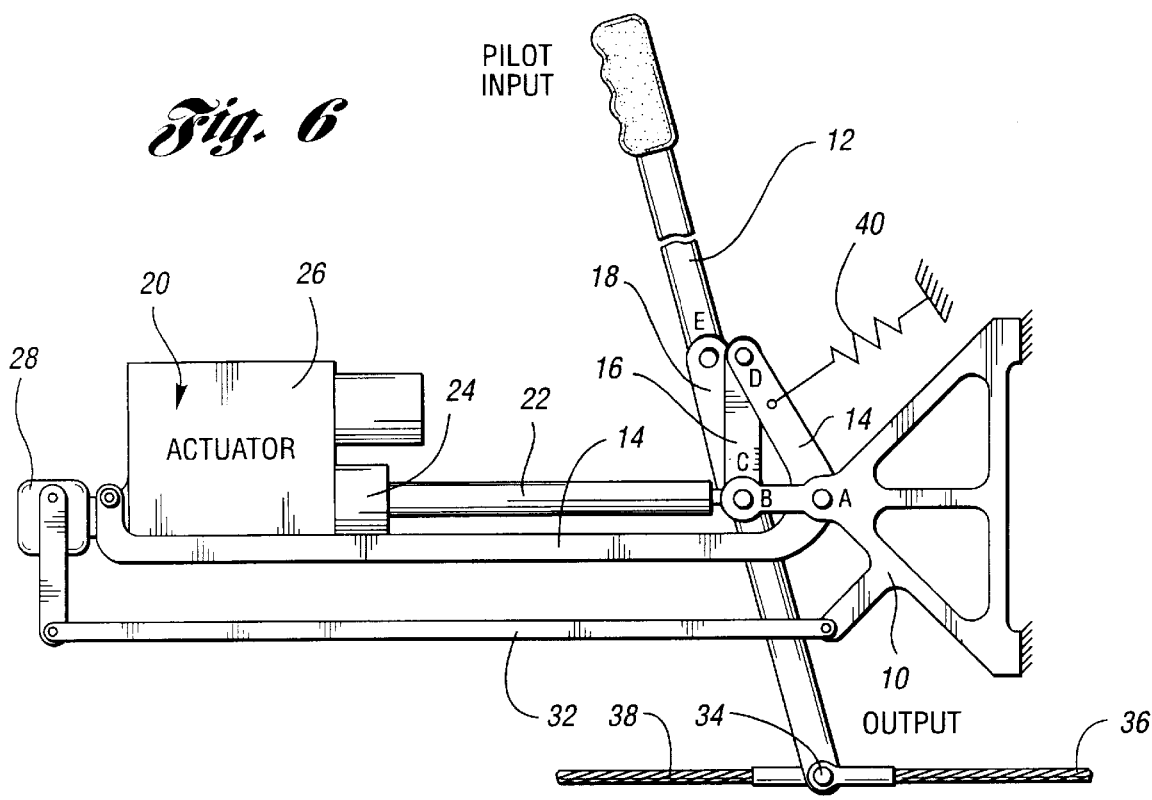
FIG. 6 is a view corresponding to FIG. 3 wherein the actuator is adjusted to the zero bobweight effect position.
Figure 7:
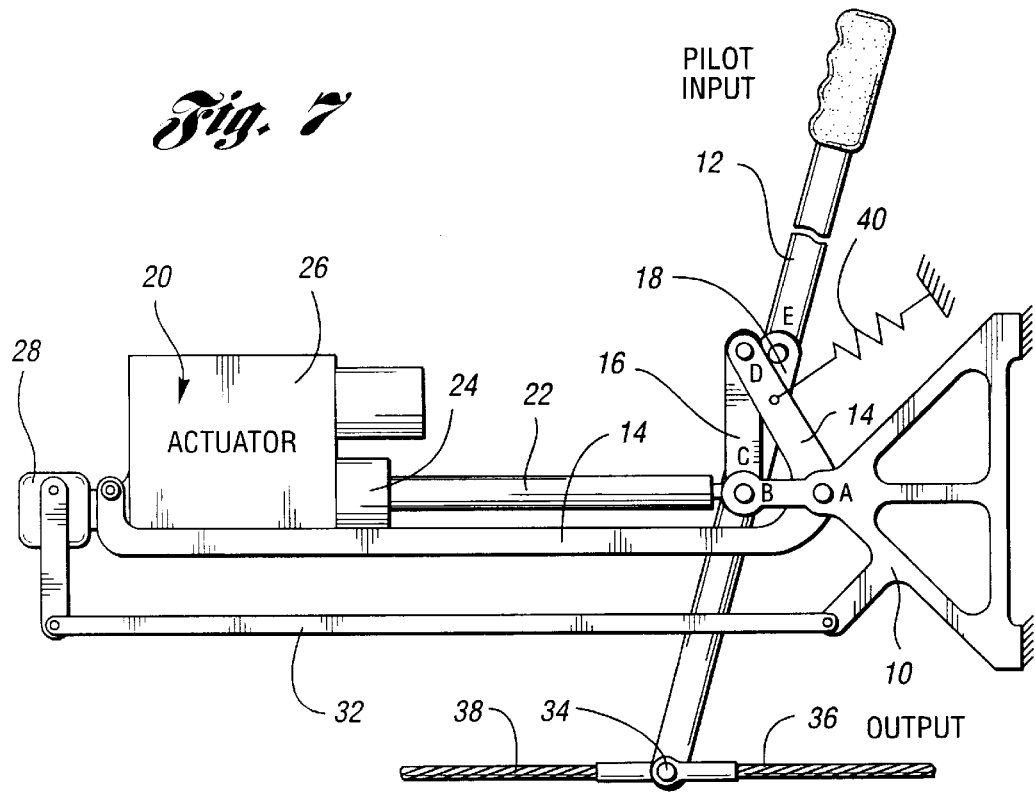
FIG. 7 is a view corresponding to FIG. 4 wherein the actuator has been adjusted to provide a zero bobweight effect.

In one embodiment, the actuator adjusts the control shaft 22 to the position shown in FIGS. 5, 6 and 7 at airspeeds less than about 250 knots. The actuator may respond also to variables other than airspeed, depending upon the particular designing requirements that are imposed by aerodynamic considerations such as altitude, position of the landing gear, etc. It may not be desirable in some instances for the actuator to be adjusted for full or intermediate bobweight effect during approach of the aircraft to a landing strip.

The ability of the actuator to terminate the bobweight effect at low airspeeds may be used as a "backup" position when the aircraft control includes a landing gear position cutout for terminating bobweight feedback. This improves the pilot's ability to control the aircraft during low speed approaches to a landing strip.

Any of a variety of dampers may be used in the structural environment of the invention, other than the damper illustrated at 28. For example, an eddy current damper is shown in prior art U.S. Pat. No. 2,772,841, and a conventional pneumatic or hydraulic damper piston is shown in prior art U.S. Pat. No. 2,797,882.

While an embodiment of the invention has been illustrated and described, it is not intended that such disclosure should illustrate and describe all possible forms of the invention. It is intended that the following claims cover all modifications and alternative designs, and all equivalents, that fall within the spirit and scope of this invention.

What is claimed is:

1. An actuator linkage mechanism for transmitting motion from a manually operable control member to a driven member comprising:

a fixed fulcrum element, the manually operable control member being pivoted at a pivot point on the fulcrum element;

a motion output portion of the control member being drivably connected to the driven member on one side of the pivot point, a manual force input portion of the control member being spaced from the output portion and the pivot point;

a bobweight lever pivoted on the fulcrum element at a point intermediate one end and the other end of the bobweight lever;

an actuator comprising an extendable actuator shaft, a first link connecting one end of the actuator shaft to one end of the bobweight lever and a second link connecting the one end of the actuator shaft to the control member;

the actuator being fixed to the bobweight lever near the other end thereof whereby movement of the control member effects movement of the bobweight lever.

2. The mechanism of claim 1 wherein the actuator comprises a bobweight mass that is movable with the bobweight lever, thereby imparting inertia force to the control member to effect an artificial bobweight force feedback simulating forces applied to the driven member.

3. The mechanism of claim 2 wherein the actuator includes means responsive to an operating variable for adjusting the extended length of the extendable shaft whereby the bobweight force feedback is variable between predetermined limits as the mechanical motion transmission ratio between the control member and the bobweight lever is changed.

4. A pilot-operated aircraft control surface adjustment mechanism comprising:

a pilot-operated lever, one end of the pilot-operated lever being connected to the control surface and the other end thereof being manually engageable by the pilot;

a fulcrum member pivotally supporting the pilot-operated member;

a bobweight lever pivoted on the fulcrum member;

an actuator mounted on the bobweight lever at one end thereof;

an extendable actuator shaft;

a first link connecting an extended end of the actuator shaft to the other end of the bobweight lever;

a second link connecting the extended end of the actuator shaft to the control member;

movement of the pilot-operated lever effecting movement of the bobweight lever with a motion transmitting ratio that is variable as a function of the extended length of the actuator shaft whereby bobweight inertia forces transmitted to the pilot-operated lever are varied between pre-designed limits.

5. The mechanism of claim 4 wherein the actuator has a mass that functions as a bobweight mass carried at the one end of the bobweight lever.

6. The mechanism of claim 5 wherein the means for adjusting the extendable shaft includes a controller responsive to airspeed whereby the bobweight inertia force is reduced when airspeed is lower than a predetermined threshold value.

7. The mechanism as set forth in claim 3 including a damper means connected to the bobweight lever for damping movement of the bobweight lever due to inertia forces on the actuator.

8. The mechanism as set forth in claim 5 including a damper means connected to the bobweight lever for damping movement of the bobweight lever due to inertia forces on the actuator.

* * * * *